(12) United States Patent
Lee

(10) Patent No.: US 7,538,808 B2
(45) Date of Patent: May 26, 2009

(54) METHOD AND SYSTEM FOR LUMINANCE NOISE FILTERING

(75) Inventor: Hyung-Guen Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 834 days.

(21) Appl. No.: 10/776,447

(22) Filed: Feb. 10, 2004

(65) Prior Publication Data

US 2004/0252208 A1 Dec. 16, 2004

(30) Foreign Application Priority Data

Jun. 10, 2003 (KR) .................. 10-2003-0037268

(51) Int. Cl.
 *H04N 5/335* (2006.01)
 *H04N 9/04* (2006.01)
(52) U.S. Cl. .................... 348/273; 348/222.1
(58) Field of Classification Search .......... 348/246, 348/247, 229.1, 223.1, 228.1, 236, 237, 238, 348/241, 235, 609, 662, 663, 665, 666, 261, 348/234, 610, 222.1, 278, 277, 279, 280; 382/162, 261
See application file for complete search history.

(56) References Cited

U.S. PATENT DOCUMENTS

| | | | |
|---|---|---|---|
| 5,382,976 A | 1/1995 | Hibbard | 348/273 |
| 5,506,619 A | 4/1996 | Adams, Jr. et al. | 348/272 |
| 5,581,298 A * | 12/1996 | Sasaki et al. | 348/222.1 |
| 5,668,932 A * | 9/1997 | Laney | 358/1.9 |
| 5,880,782 A * | 3/1999 | Koyanagi et al. | 348/364 |
| 6,091,862 A | 7/2000 | Okisu | 382/300 |
| 6,269,181 B1 * | 7/2001 | Acharya | 382/162 |
| 6,937,772 B2 * | 8/2005 | Gindele | 382/240 |
| 7,139,022 B1 * | 11/2006 | Raffy | 348/273 |
| 2002/0122119 A1 * | 9/2002 | Takakura | 348/223.1 |
| 2003/0081465 A1 | 5/2003 | Cho | |
| 2004/0161145 A1 * | 8/2004 | Embler | 382/165 |

* cited by examiner

*Primary Examiner*—Lin Ye
*Assistant Examiner*—Nelson D Hernández Hernández
(74) *Attorney, Agent, or Firm*—Monica H. Choi

(57) ABSTRACT

In a method and system for luminance noise filtering, a region of pixel data directly from the image sensor is used for determining a virtually filtered luminance for a pixel location within the region. Luminance noise reduction is performed using the region of pixel data directly from the image sensor such that frame memory is eliminated. In addition, the present invention provides adaptive noise filtering by selecting the virtually filtered luminance as a final luminance for a darker image and by selecting a reference luminance without virtual noise filtering for a brighter image.

18 Claims, 8 Drawing Sheets

METHOD AND SYSTEM FOR LUMINANCE NOISE FILTERING

CROSS-REFERENCE TO RELATED APPLICATION(S)

The present application claims priority under 35 U.S.C. § 119 to Korean Patent Application No. 2003-0037268, filed on Jun. 10, 2003, which is incorporated herein by reference in its entirety.

TECHNICAL FIELD

The present invention relates generally to image pick-up devices, and more particularly, to luminance noise filtering for a pixel location using a region of pixel data directly from an image sensor such that line memory capacity is minimized.

BACKGROUND OF THE INVENTION

FIG. 1 illustrates an image pick-up device 102 such as a camera system that includes an image sensor 104. The image sensor 104 generates pixel data for an image of an object 106 that is projected through an objective lens 108 onto the image sensor 104. For example, the image sensor 104 may be a CIS (CMOS image sensor) commonly used in hand-held devices such as cell phones and PDA's (personal digital assistants).

A signal processor 110 manipulates the pixel data from the image sensor 104 for showing the image of the object 106 on a display 112, or for further processing by an image recognition system 114, or for sending the image via a transmission system 116 such that the image is shown on a remote display 118. Referring to FIGS. 1 and 2, the image sensor 104 generates pixel data 120 according to a Bayer filter array overlying the image sensor 104.

With the Bayer filter array, the image sensor 104 generates an intensity signal of a respective color at each pixel location. A square labeled with an "R" is for a pixel location on the image sensor 104 that generates an intensity signal of the red color component. Similarly, a square labeled with a "G" is for a pixel location on the image sensor 104 that generates an intensity signal of the green color component. Further, a square labeled with a "B" is for a pixel location on the image sensor 104 that generates an intensity signal of the blue color component.

An interpolation algorithm is then used by the signal processor 110 to determine the full set of intensity signals of the respective interpolated RGB color components for each of the pixel locations. The interpolation algorithm uses the pixel data of the Bayer color filter array 120 for such a determination.

Such an interpolation algorithm is known to one of ordinary skill in the art as disclosed in U.S. Pat. No. 5,382,976, U.S. Pat. No. 5,506,619, or U.S. Pat. No. 6,091,862. For determining the interpolated color components R', G', and B' at a particular pixel location 124 with such an interpolation algorithm, a region of pixel data 126 surrounding that pixel location 124 is used as illustrated in FIG. 3.

Temporal noise affects the quality of the image of the object as detected and generated by the image pick-up device 102. Temporal noise is the variation in the output from the image sensor 104 even under uniform illumination onto the image sensor 104. Such temporal noise may arise from shot noise and 1/f noise at the photo-diodes of the image sensor 104, from thermal noise at the transistors and other circuit components used within the image sensor 104, or from quantization error of an A/D (analog to digital) converter used within the image sensor 104.

Such temporal noise increases with brightness of the image. However, the detrimental effect of the temporal noise on the image is greater at lower illumination because the SNR (signal to noise ratio) decreases with lower illumination. In fact, temporal noise sets a limit on the dynamic range of the image sensor 104 under dark conditions.

FIG. 4 illustrates a prior art process for reducing the effect of such temporal noise. The pixel data 120 is generated with the Bayer color filter array at the image sensor 104. The signal processor 110 interpolates such pixel data 120 to generate the respective interpolated RGB color components 122A, 122B, and 122C that are stored within a frame memory device 122 of the prior art.

In the prior art, after the interpolated RGB color components 122A, 122B, and 122C for an n×n array of pixel locations are generated and stored in the frame memory device 122, a noise reducing block 132 uses such interpolated RGB color components for reducing the deleterious effects of the temporal noise. FIG. 4 shows the noise reducing block 132 using the 3×3 arrays of the interpolated RGB color components 122A, 122B, and 122C. However, other prior art noise reducing processes may also use 5×5, 7×7, or other n×n arrays of the interpolated RGB color components.

In any case for the prior art noise reducing process, the capacity of the frame memory device 122 is sufficient to store the n×n arrays of interpolated RGB color components used by the noise reducing block 132. However, such a relatively large capacity of the frame memory device 122 is disadvantageous when the camera system 102 is incorporated as part of a hand-held device such as a cell phone or a PDA for example. Thus, elimination of the frame memory device 122 is desired for a smaller device size, lower power dissipation, and lower cost especially when the camera system 102 is incorporated into a hand-held device.

SUMMARY OF THE INVENTION

Accordingly, in a general aspect of the present invention, luminance noise filtering is performed for a pixel location using a relatively small region of pixel data directly from the image sensor such that the frame memory may be eliminated.

In a general embodiment of the present invention, in a method and system for luminance noise filtering, a region of pixel data from the image sensor is used for determining a virtually filtered luminance for a pixel location within the region. In an example embodiment, the virtually filtered luminance is determined by averaging the respective pixel data multiplied with a respective weighting coefficient for each pixel location of the region.

In another embodiment of the present invention, the color components for the pixel location are determined from the region of pixel data.

In a further embodiment of the present invention, a reference luminance is determined for the pixel location from the color components. A final luminance of the pixel location is selected between the virtually filtered luminance and the reference luminance depending on an adaptive luminance that indicates the brightness of the image. The present invention provides adaptive noise filtering by selecting the virtually filtered luminance as the final luminance for a darker image.

In this manner, noise filtering is performed for a pixel location within a region of pixel data using virtual luminance that is determined using such a region of pixel data directly from the image sensor. Thus, frame memory for storing interpolated pixel data is eliminated with the present invention. The elimination of frame memory is especially advantageous for smaller device size, lower power dissipation, and lower cost of the camera system incorporated into a hand-held device.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference number in FIGS. 1, 2, 3, 4, 5, 6, 7, 8, 9, 10, 11, and 12 refer to elements having similar structure and function.

DETAILED DESCRIPTION

Figure 1:
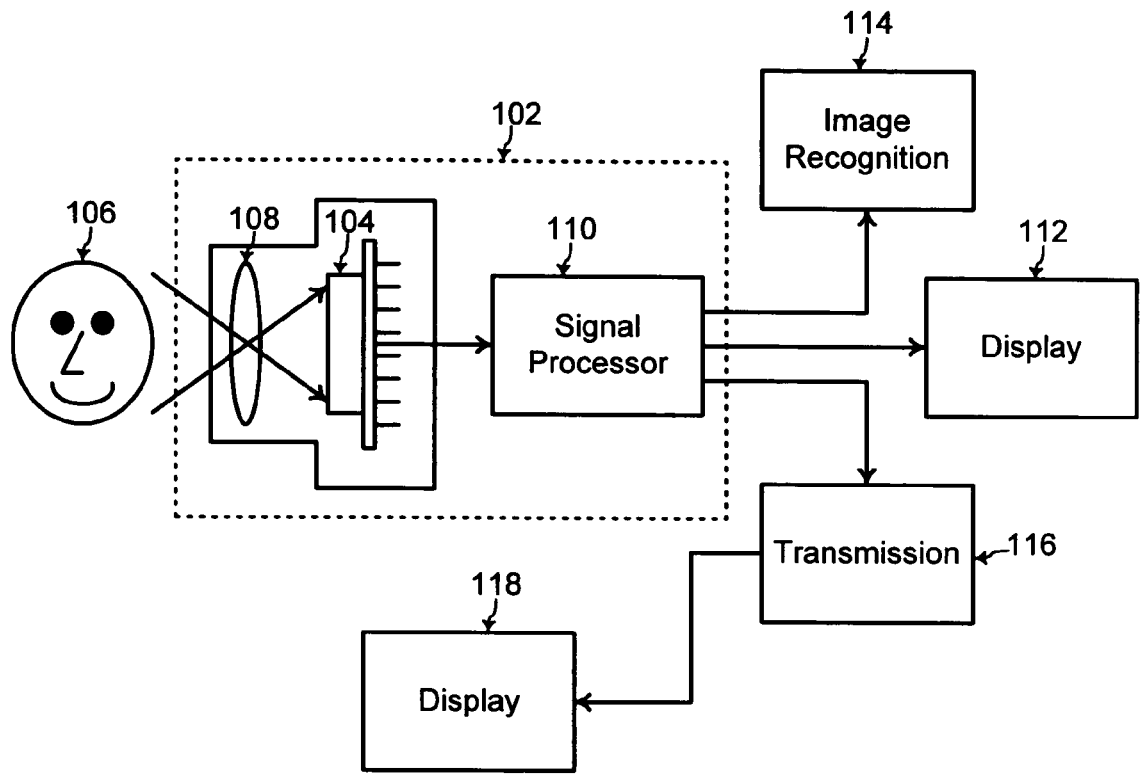
FIG. 1 shows components of an image pick-up device such as a camera system, according to the prior art.
Figure 2:
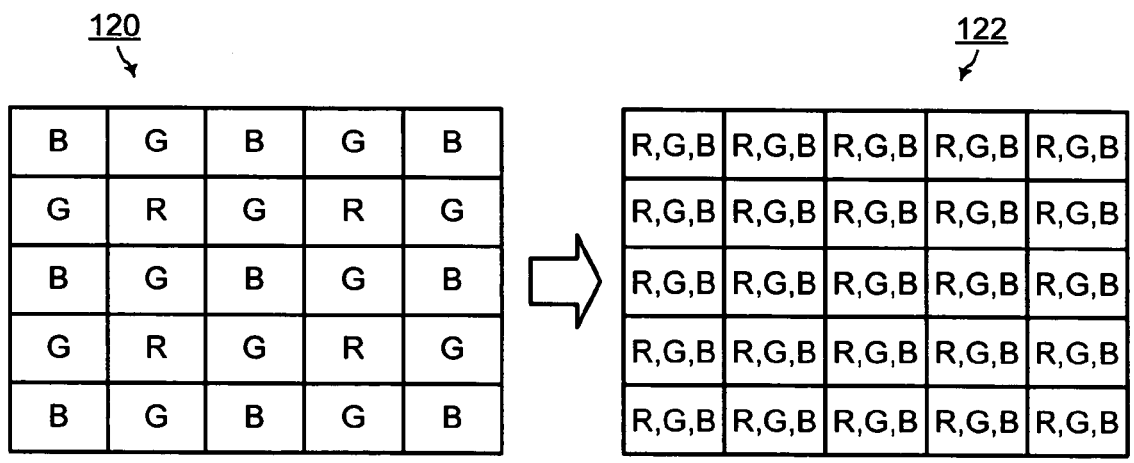
FIG. 2 illustrates interpolation of pixel data generated with a Bayer color filter array into color components, according to the prior art.
Figure 3:
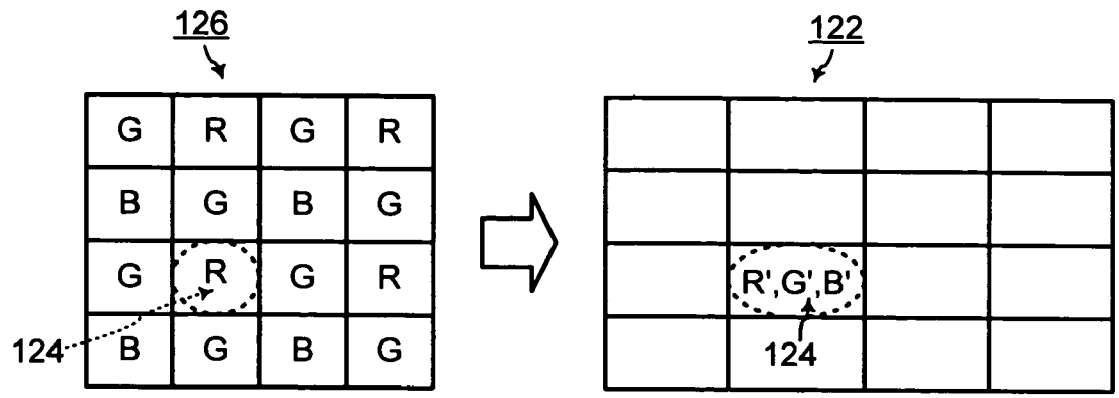
FIG. 3 illustrates use of a region of pixel data generated with a Bayer color filter array for determining the color components of a pixel location within the region, according to the prior art.
Figure 5:
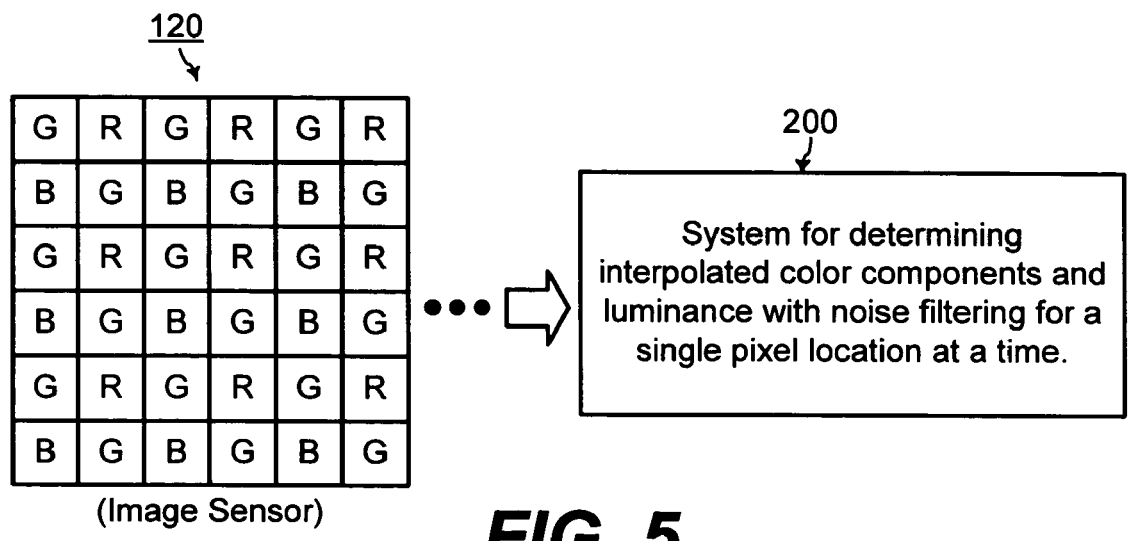
FIG. 5 illustrates a process for performing noise filtering using a region of pixel data for determining the luminance and the color components of a pixel location, according to an example embodiment of the present invention.
Figure 4:
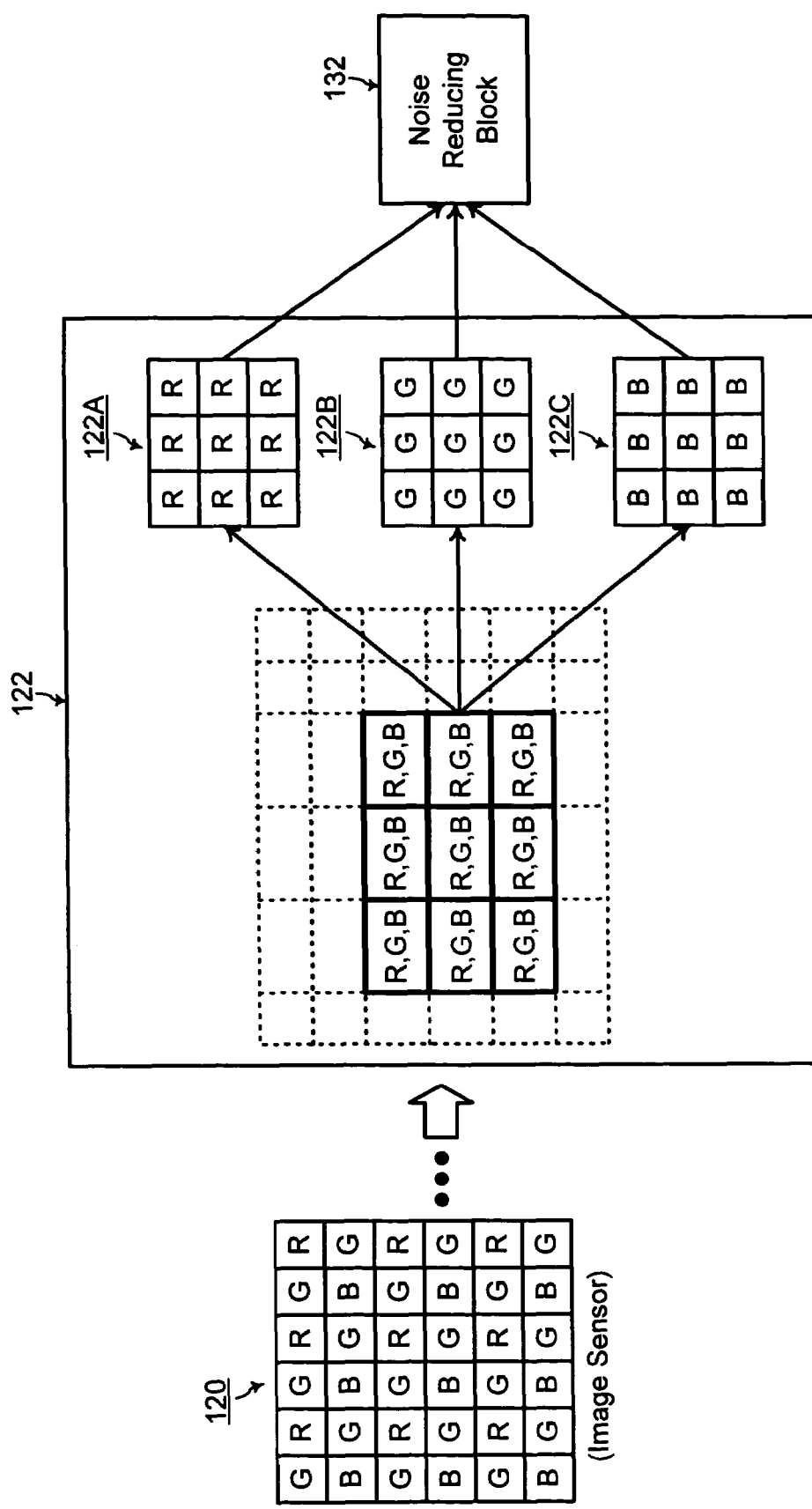
FIG. 4 illustrates a process for performing noise reduction after a n×n array of color components has been determined, according to the prior art.
Figure 6:
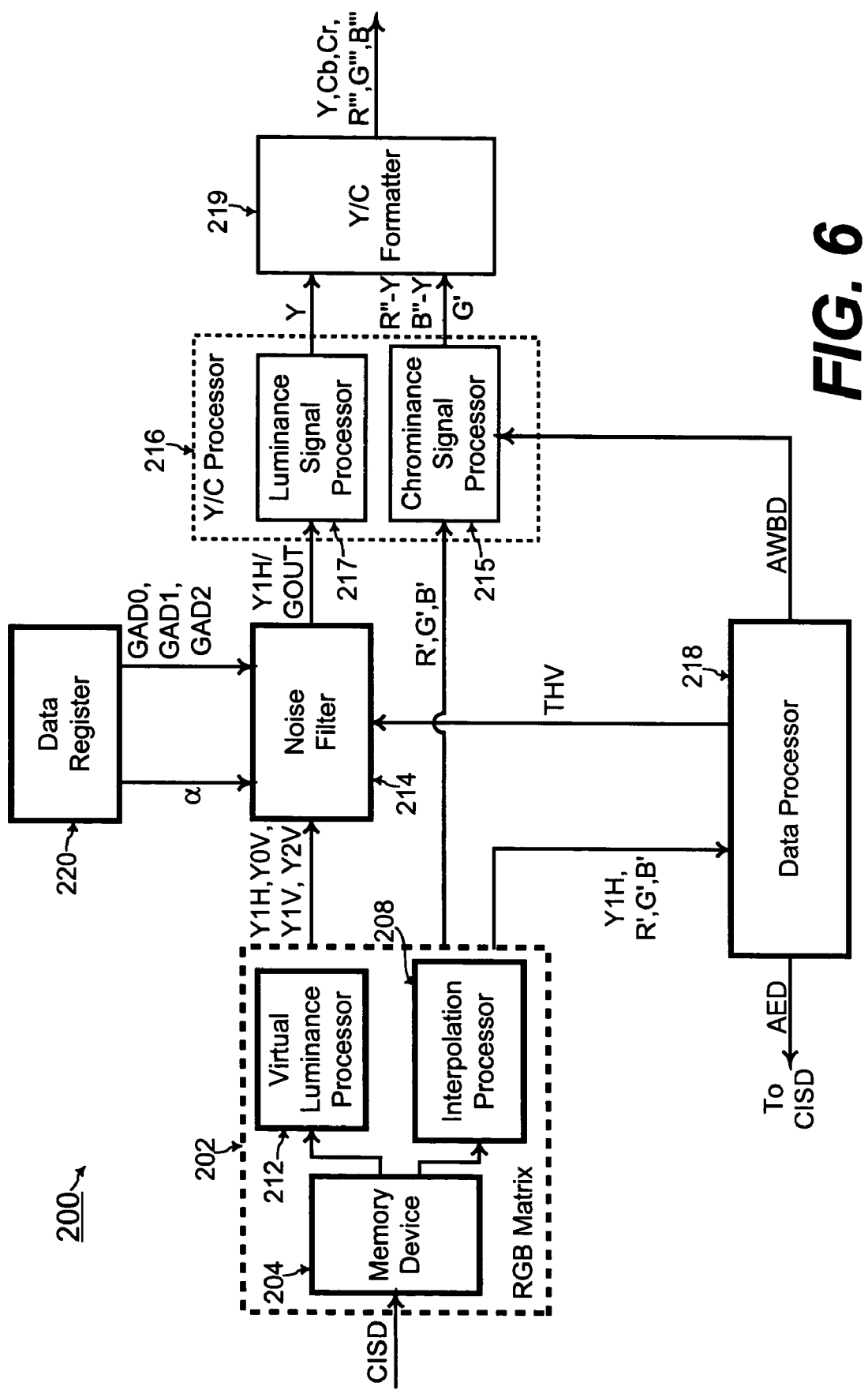
FIG. 6 shows a block diagram of a system for performing noise filtering as illustrated in FIG. 5 such that frame memory is eliminated, according to an example embodiment of the present invention.
Figure 7:
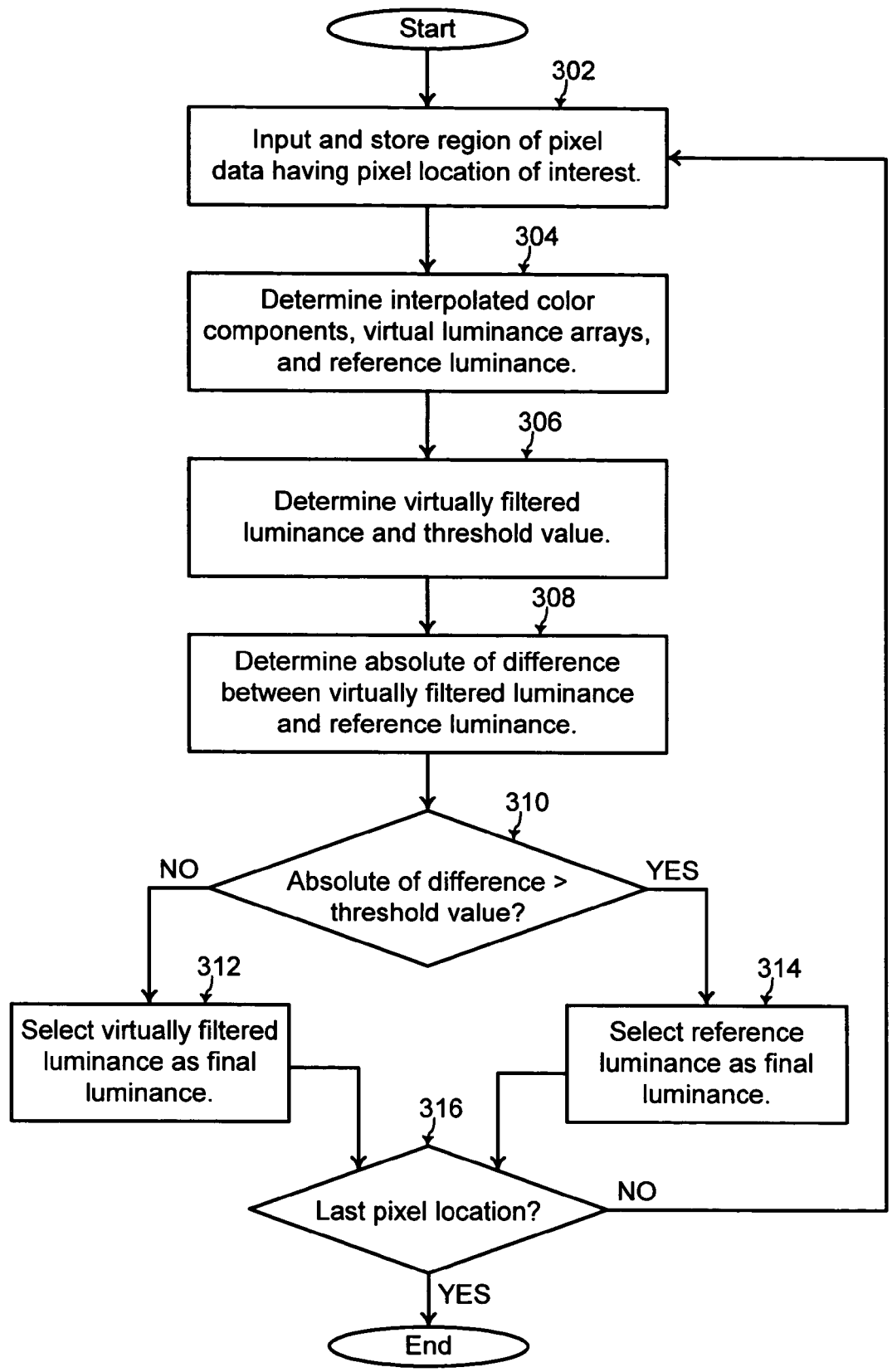
FIG. 7 shows a flowchart during operation of the system of FIG. 6, according to an example embodiment of the present invention.

Referring to FIGS. 5 and 6, a system 200 of a general aspect of the present invention performs noise filtering using a region of pixel data directly from the image sensor 104. In addition, the noise filtering is performed during determination of the luminance using such a region of pixel data for a single pixel location within the region. FIG. 7 shows a flowchart of steps during operation of the system 200 of FIG. 6.

Figure 8:
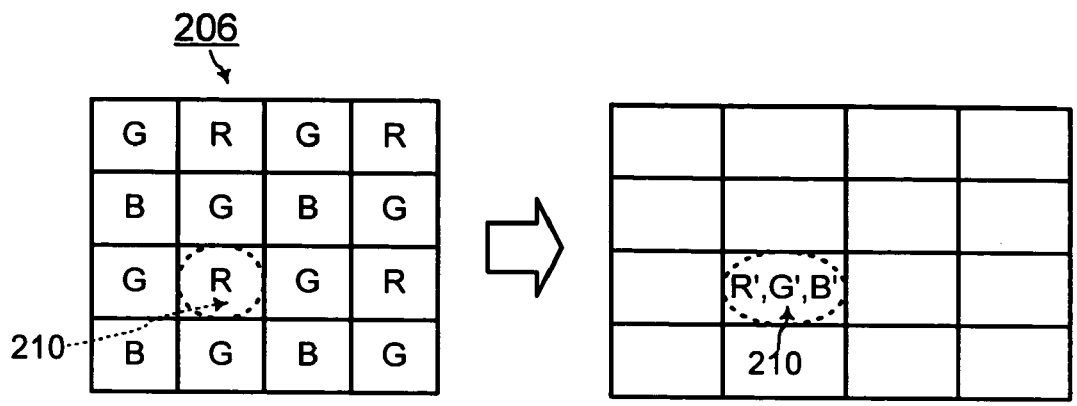
FIG. 8 illustrates use of a region of pixel data generated with the Bayer color filter array for determining color components of a pixel location within the region in a step of the flowchart of FIG. 7, according to an example embodiment of the present invention.

The system 200 is typically implemented within the signal processor 110 for manipulating pixel data from the image sensor 104. Referring to FIGS. 6, 7, and 8, a RGB matrix 202 includes a line memory device 204 for inputting and storing a region of pixel data 206 generated with a Bayer color filter array at the image sensor 104 (step 302 of FIG. 7).

The line memory device 204 may be implemented with any type of data storage devices. For example, the line memory device 204 may store pixel data for 4×H pixel locations with H being the number of columns of pixels at the image sensor 104 (such as 648 columns for example) when the image sensor 104 outputs pixel data row by row.

The RGB matrix 202 also includes an interpolation processor 208 for determining interpolated color components R', B', and G' of a pixel location 210 within the region 206 (step 304 of FIG. 7). Referring to FIG. 8, the interpolation processor 208 interpolates the region of pixel data 206 to generate the interpolated color components R', B', and G'. Such interpolation algorithms for generating the interpolated color components R', B', and G' are known to one of ordinary skill in the art.

In addition, the RGB matrix 202 determines a reference luminance, Y1H, from the interpolated color components R', B', and G' as follows (step 304 of FIG. 7):

$$Y1H = (19*R' + 38*G' + 7*B')/64$$

Such a reference luminance Y1H is calculated according to a conventional standard in the industry for calculating luminance as known to one of ordinary skill in the art.

Figure 9A:
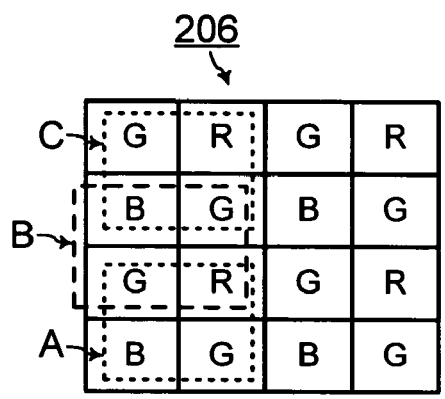
FIGS. 9A, 9B, and 9C illustrate use of the region of pixel data of FIG. 8 for determining a plurality of virtual luminance arrays, according to an example embodiment of the present invention.

Furthermore, the RGB matrix 202 includes a virtual luminance processor 212 for determining virtual luminance arrays Y0V, Y1V, and Y2V (step 304 of FIG. 7). Referring to FIG. 9A, a first virtual luminance array Y0V=[A B C], with A, B, and C each being a respective average of the intensity values of a respective four pixels included in a box correspondingly labeled as A, B, and C in the region of pixel data 206.

Figure 9B:
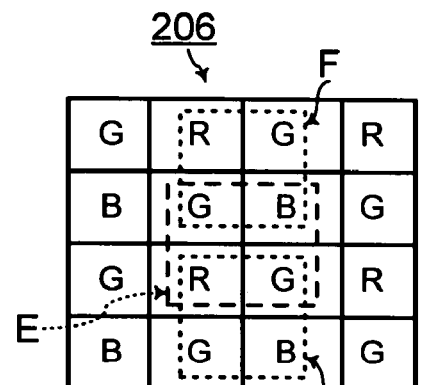
Figure 9C:
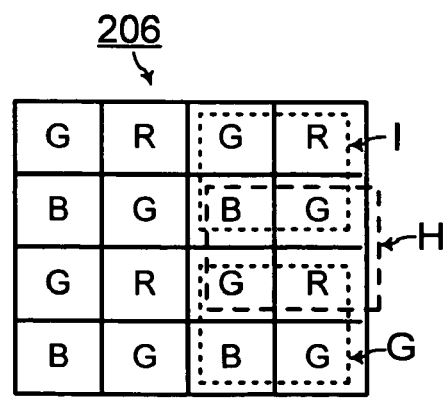

Similarly, referring to FIG. 9B, a second virtual luminance array Y1V=[D E F], with D, E, and F each being a respective average of the intensity values of a respective four pixels included in a box correspondingly labeled as D, E, and F in the region of pixel data 206. Also, referring to FIG. 9C, a third virtual luminance array Y2V=[G H I], with G, H, and I each being a respective average of the intensity values of a respective four pixels included in a box correspondingly labeled as G, H, and I in the region of pixel data 206. In this manner, the virtual luminance arrays Y0V, Y1V, and Y2V are determined for the pixel location 210 using the region of pixel data 206 that also determines the interpolated color components R', G', and B' for the pixel location 210.

Referring back to FIG. 6, the RGB matrix 202 sends the reference luminance Y1H and the virtual luminance arrays Y0V, Y1V, and Y2V to a noise filter 214. In addition, the RGB matrix 202 sends the interpolated color components R', G', and B' to a chrominance signal processor 215 within a Y/C (luminance/chrominance) processor 216. Furthermore, the RGB matrix 202 sends the reference luminance Y1H and the interpolated color components R', G', and B' to a data processor 218.

Figure 10:
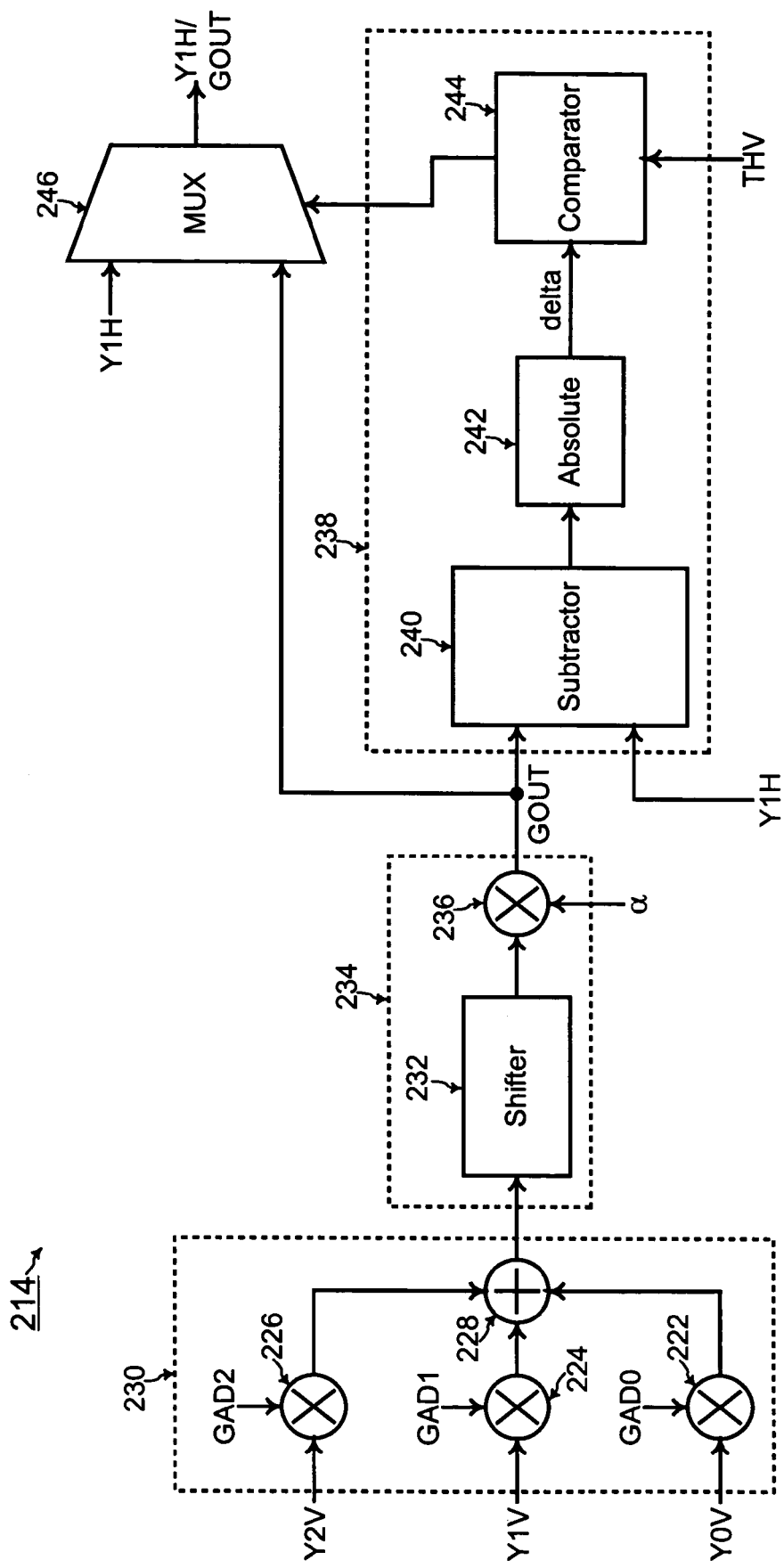
FIG. 10 shows a block diagram of a noise filter within the system of FIG. 6, according to an example embodiment of the present invention.

FIG. 10 shows a block diagram for an example embodiment of the noise filter 214 that determines a virtually filtered luminance GOUT (step 306 of FIG. 7) from the virtual luminance arrays Y0V, Y1V, and Y2V. The noise filter 214 includes multipliers 222, 224, and 226 and an adder 228 within a multiplying and summing block 230.

The first multiplier 222 multiplies the first luminance array Y0V with a first weighted coefficient array GAD0 [39 63 39] as follows:

$$39*A+63*B+39*C.$$

Similarly, the second multiplier 224 multiplies the second luminance array Y1V with a second weighted coefficient array GAD1 [63 104 63] as follows:

$$63*D+104*E+63*F.$$

Also, the third multiplier 226 multiplies the third luminance array Y2V with a third weighted coefficient array GAD2 [39 63 39] as follows:

$$39*G+63*H+39*I.$$

The adder 228 sums together the resulting values from the multipliers 222, 224, and 226. A shifter 232 within a brightness control block 234 divides the result from the adder 228 with a sum of all the coefficients of GAD0, GAD1, and GAD2 (i.e., 512). A fourth multiplier 236 within the brightness control block 234 multiplies the result from the shifter 232 by a luminance compensation factor $\alpha$, to generate the virtually filtered luminance GOUT.

In one embodiment of the present invention, the luminance compensation factor $\alpha$ and the weighted coefficient arrays GAD0, GAD1, and GAD2 are determined using a Gaussian distribution equation for optimum image quality and are stored within a data register 220 in FIG. 6. In this manner, the virtually filtered luminance GOUT is determined by averaging a respective pixel data multiplied with a respective weighting coefficient for each pixel location of the region 206.

Figure 11:
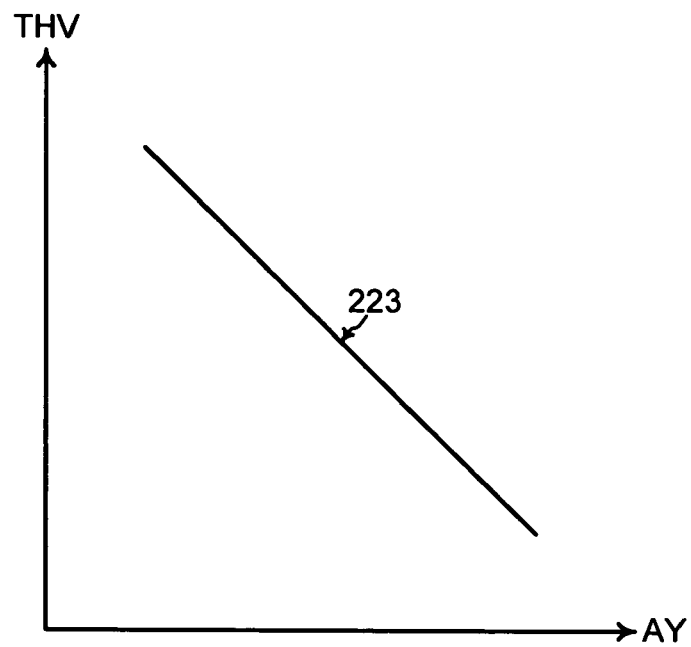
FIG. 11 shows an example graph used by a data processor within the system of FIG. 6 for determining a threshold value depending on an adaptive luminance, according to an example embodiment of the present invention.

In addition, referring to FIG. 6, the data processor 218 determines a threshold value THV (step 306 of FIG. 7). Referring to FIG. 11, the data processor 218 determines THV dependent on an adaptive luminance, AY, as illustrated by the graph 223 of FIG. 11. The adaptive luminance, AY, indicates the overall brightness of a previous image, in one example embodiment of the present invention.

Figure 12:
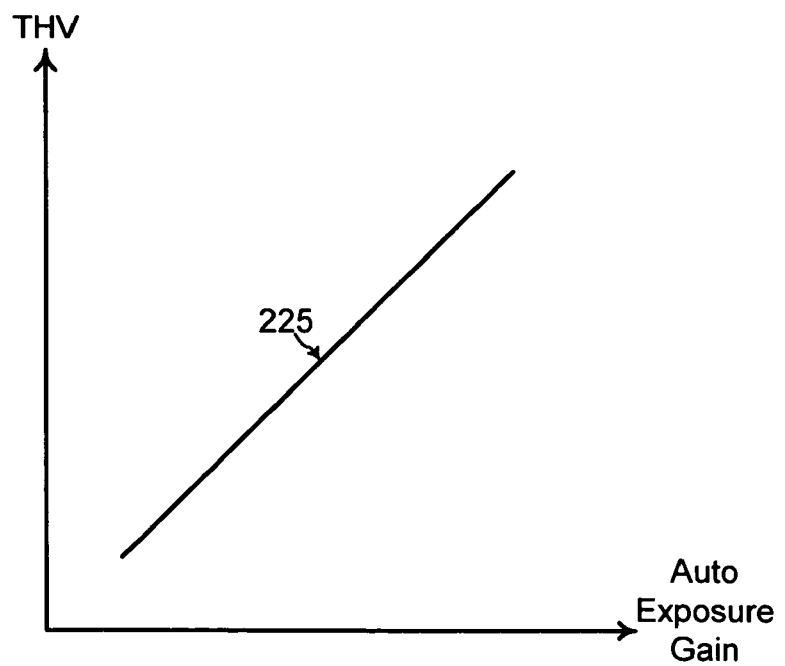
FIG. 12 shows another example graph used by the data processor within the system of FIG. 6 for determining the threshold value depending on an auto exposure gain of the camera system, according to an example embodiment of the present invention.

For example, in FIG. 12, THV is determined according to another graph 225 dependent on the auto exposure gain used by the camera system 102. The auto exposure gain indicates a brightness of the image to be detected by the image sensor 102 within the camera system 102, as known to one of ordinary skill in the art. A higher auto exposure gain indicates a darker image for a higher THV according to the graph 225 of FIG. 12. In such an example, the auto exposure gain indicates the adaptive luminance AY.

In another embodiment of the present invention, the reference luminance Y1H is used as indicating the adaptive luminance AY in FIG. 11. In that case, THV is determined depending on a brightness level for each pixel location. Alternatively, the adaptive luminance AY is an average of the respective reference luminance Y1H for a predetermined region of pixel data. In any case, the THV is determined to be higher for a darker image according to the graph 223 of FIG. 11.

Referring back to FIG. 10, a comparing block 238 includes a subtractor 240 and an absolute value generator 242 that determine an absolute of the difference between the virtually filtered luminance GOUT and the reference luminance Y1H (i.e., delta) (step 308 of FIG. 7). A comparator 244 within the comparing block 238 compares delta with THV (step 310 in FIG. 7).

In FIG. 10, a multiplexer 246 inputs the reference luminance Y1H and the virtually filtered luminance GOUT. The comparator 244 controls the multiplexer 246 to select and output the virtually filtered luminance GOUT as a final luminance of the pixel location 210 when delta is less than or equal to THV (step 312 of FIG. 7). Alternatively, the comparator 244 controls the multiplexer 246 to select and output the reference luminance Y1H as the final luminance of the pixel location 210 when delta is greater than THV (step 314 of FIG. 7).

If the pixel location 210 is a last pixel location for an image (step 316 of FIG. 7), the flowchart of FIG. 7 ends. Otherwise, steps 302, 304, 306, 308, 310, 312, 314, and 316 are repeated for another pixel location with another region of pixel data from the image sensor 104. Such steps are repeated for determining the respective luminance and interpolated color components for each pixel location with a respective region of pixel data of the image.

Generally, a larger array of pixel data is generated from the image sensor 104 for producing a smaller array of the processed image, as known to one of ordinary skill in the art. Pixel data from locations toward the outer perimeter of the image sensor 104 are used for image signal processing of adjacent pixel locations toward the center of the processed image. However, such pixel locations toward the outer perimeter become cut off from the processed image because a sufficient region of pixel data surrounding such a pixel location is not available, as known to one of ordinary skill in the art. Steps, 304, 306, 308, 310, 312, 314, and 316 of FIG. 7 are repeated for each of the pixel locations for the processed image.

In this manner, noise filtering is performed for a single pixel location using a region of pixel data 206 directly from the image sensor 104 while determining the final luminance Y1H/GOUT for the pixel location 210. The region of pixel data 206 is also used for determining the interpolated color components R', G', and B' of the pixel location 210. Because noise filtering is performed by using the region of pixel data 206 directly from the image sensor 104, frame memory for storing interpolated pixel data may be eliminated with the present invention.

Thus, the capacity of the memory device included in the image pick-up device may be minimized since the luminance noise filter uses the image data directly from the image sensor for determining the final luminance Y1H/GOUT and the interpolated color components R', G', and B' of the pixel location 210. Such smaller memory capacity is advantageous for smaller device size, lower power dissipation, and lower cost especially when the camera system is incorporated into a hand-held device.

In addition, the present invention provides adaptive noise filtering by varying the threshold value THV depending on the brightness of the image. For a brighter image, the reference luminance Y1H is selected as the final luminance instead of the virtually filtered luminance GOUT. Noise filtering introduces distortion to the image, and the effect of temporal noise is less for a brighter image. Thus, the reference luminance Y1H without distortion from virtual noise filtering is selected as the final luminance for a brighter image. On the other hand, the deleterious effect of temporal noise is greater for a darker image. Thus, the virtually filtered luminance GOUT with noise filtering is selected as the final luminance for a darker image.

Referring back to FIG. 6, a luminance signal processor 217 within the Y/C processor 216 processes the final luminance Y1H/GOUT for performing contour compensation to output a luminance signal Y for a Y/C (luminance/chrominance) formatter 219. A chrominance signal processor 217 within the Y/C processor 216 receives the interpolated color components R', G', and B' and auto white balance data (AWBD) from the data processor 218 to generate further color components R"—Y and B"—Y for the Y/C formatter 219. The R" is an intensity of the interpolated color component R' which is adjusted by the auto white balance data, and the B" is an intensity of the interpolated color component B' which is adjusted by the auto white balance data.

The Y/C formatter 219 generates luminance and chrominance data Y, Cb, Cr/R, and color data R''', G''', and B''' according to a standard as required by the display 112, the image recognition system 116, or the transmission system 116. Such components of the Y/C processor 216 and the Y/C formatter 219 are known to one of ordinary skill in the art. The data processor 218 also determines and outputs to the image pick-up device auto exposure control data AED from Y1H, R', G', and B', as known to one of ordinary skill in the art. The present invention lies in the darkly outlined components of the RGB matrix 202, the noise filter 214, the data processor 218, and the data register 220 in FIG. 6, and the other components of FIG. 6 are known to one of ordinary skill in the art.

The foregoing is by way of example only and is not intended to be limiting. For example, the present invention is described for the camera system 102 that may be part of a hand-held device. However, the present invention may be used for any type of imaging device performing image signal processing. In addition, the components illustrated and described herein for an example embodiment of the present invention may be implemented with any combination of hardware and/or software and in discrete and/or integrated circuits. In addition, any number as illustrated and described herein is by way of example only. For example, any number of pixels as illustrated and described herein is by way of example only.

The present invention is limited only as defined in the following claims and equivalents thereof.

The invention claimed is:

1. A method for luminance noise filtering in an imaging device, comprising:
   inputting a region of pixel data from an image sensor;
   determining a virtually filtered luminance from a first processing of said region of pixel data and without using other pixel data for a pixel location within the region;
   determining a reference luminance for the pixel location from a second processing of said same region of pixel data and without using other pixel data,
   wherein the reference luminance is determined after respective interpolated color components for the pixel location are determined such that the reference luminance is determined using said respective interpolated color components;
   selecting between the virtually filtered luminance and the reference luminance as a final luminance of the pixel location depending on an adaptive luminance;
   determining in a data processor, a threshold value from the adaptive luminance;
   selecting the virtually filtered luminance if an absolute of a difference between the virtually filtered luminance and the reference luminance is less than or equal to the threshold value; and
   selecting the reference luminance if the absolute of the difference between the virtually filtered luminance and the reference luminance is greater than the threshold value;
   wherein the adaptive luminance is determined from an overall brightness of a previous image.

2. The method of claim 1, wherein the second processing includes the steps of:
   determining said interpolated color components for the pixel location from said region of pixel data; and
   determining the reference luminance for the pixel location from the interpolated color components.

3. The method of claim 1, wherein the virtually filtered luminance is determined by averaging a respective pixel data multiplied with a respective weighting coefficient for each pixel location of the region.

4. The method of claim 1, wherein the image sensor is part of a hand-held image pick-up device having minimized line memory capacity.

5. The method of claim 1, wherein the threshold value is greater when the adaptive luminance is lower.

6. A method for luminance noise filtering in an imaging device, comprising:
   inputting a region of pixel data from an image sensor;
   determining a virtually filtered luminance from a first processing of said region of pixel data and without using other pixel data for a pixel location within the region;
   determining a reference luminance for the pixel location from a second processing of said same region of pixel data and without using other pixel data,
   wherein the reference luminance is determined after respective interpolated color components for the pixel location are determined such that the reference luminance is determined using said respective interpolated color components;
   selecting between the virtually filtered luminance and the reference luminance as a final luminance of the pixel location depending on an adaptive luminance;
   determining in a data processor, a threshold value from the adaptive luminance;
   selecting the virtually filtered luminance if an absolute of a difference between the virtually filtered luminance and the reference luminance is less than or equal to the threshold value; and
   selecting the reference luminance if the absolute of the difference between the virtually filtered luminance and the reference luminance is greater than the threshold value;
   wherein the threshold value is greater when the adaptive luminance is lower.

7. The method of claim 6, wherein the second processing includes the steps of:
   determining said interpolated color components for the pixel location from said region of pixel data; and
   determining the reference luminance for the pixel location from the interpolated color components.

8. The method of claim 6, wherein the virtually filtered luminance is determined by averaging a respective pixel data multiplied with a respective weighting coefficient for each pixel location of the region.

9. The method of claim 6, wherein the image sensor is part of a hand-held image pick-up device having minimized line memory capacity.

10. A system for luminance noise filtering, comprising:
    a memory device for storing a region of pixel data from an image sensor;
    a noise filter for determining a virtually filtered luminance from a first processing of said region of pixel data and without using other pixel data for a pixel location within the region;
    a matrix for determining a reference luminance for the pixel location from a second processing of said same region of pixel data and without using other pixel data;
    wherein the matrix determines the reference luminance after respective interpolated color components for the pixel location are determined such that the reference luminance is determined using said respective interpolated color components:

and wherein the noise filter selects between the virtually filtered luminance and the reference luminance as a final luminance of the pixel location depending on an adaptive luminance: and a data processor that determines a threshold value from the adaptive luminance:

wherein the noise filter selects the virtually filtered luminance if an absolute of a difference between the virtually filtered luminance and the reference luminance is less than or equal to the threshold value:

and wherein the noise filter selects the reference luminance if the absolute of the difference between the virtually filtered luminance and the reference luminance is greater than the threshold value:

and wherein the adaptive luminance is determined from an overall brightness of a previous image.

11. The system of claim 10, wherein the matrix determines said interpolated color components for the pixel location from said region of pixel data such that the reference luminance is determined from the interpolated color components.

12. The system of claim 10, and wherein the threshold value is greater when the adaptive luminance is lower.

13. The system of claim 10, wherein the virtual luminance is determined by averaging a respective pixel data multiplied with a respective weighting coefficient for each pixel location of the region.

14. The system of claim 10, wherein the image sensor is part of a hand-held image pick-up device having minimized line memory capacity.

15. A system for luminance noise filtering, comprising:

a memory device for storing a region of pixel data from an image sensor:

a noise filter for determining a virtually filtered luminance from a first processing of said region of pixel data and without using other pixel data for a pixel location within the region:

a matrix for determining a reference luminance for the pixel location from a second processing of said same region of pixel data and without using other pixel data:

wherein the matrix determines the reference luminance after respective interpolated color components for the pixel location are determined such that the reference luminance is determined using said respective interpolated color components:

and wherein the noise filter selects between the virtually filtered luminance and the reference luminance as a final luminance of the pixel location depending on an adaptive luminance: and a data processor that determines a threshold value from the adaptive luminance:

wherein the noise filter selects the virtually filtered luminance if an absolute of a difference between the virtually filtered luminance and the reference luminance is less than or equal to the threshold value:

and wherein the noise filter selects the reference luminance if the absolute of the difference between the virtually filtered luminance and the reference luminance is greater than the threshold value:

and wherein the threshold value is greater when the adaptive luminance is lower.

16. The system of claim 15, wherein the matrix determines said interpolated color components for the pixel location from said region of pixel data such that the reference luminance is determined from the interpolated color components.

17. The system of claim 15, wherein the virtual luminance is determined by averaging a respective pixel data multiplied with a respective weighting coefficient for each pixel location of the region.

18. The system of claim 15, wherein the image sensor is part of a hand-held image pick-up device having minimized line memory capacity.

* * * * *